United States Patent

Dietrich

[15] 3,639,902

[45] Feb. 1, 1972

[54] CHARACTER RECOGNITION USING SHAPE DETECTION

[72] Inventor: Walter Dietrich, Breslauerstr, Germany

[73] Assignee: International Standard Electric Corporation, New York, N.Y.

[22] Filed: Mar. 4, 1970

[21] Appl. No.: 16,515

[30] Foreign Application Priority Data

Mar. 5, 1969 Germany ......................P 19 11 269.7

[52] U.S. Cl. ..............................340/146.3 J, 340/146.3 AC

[51] Int. Cl. ..........................................................G06k 9/13

[58] Field of Search...............................................340/146.3

[56] References Cited

UNITED STATES PATENTS 3,104,372 9/1963 Rabinow et al. .............340/146.3 AG 3,178,688 4/1965 Hill et al. ............................340/146.3

3,305,835 2/1967 Beltz ...............................340/146.3 J 3,382,482 5/1968 Greenly.......................340/146.3 AC

*Primary Examiner*—Thomas A. Robinson

*Assistant Examiner*—William W. Cochran

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

The arrangement according to the disclosure provides, in addition to the actual recognition, that there is detected a distinction in identical zones with respect to similar characters appearing in those zones. The result of this added discrimination serves to increase the recognition reliability of the character detected and to reduce the possibility of errors in the case of similar characters.

5 Claims, 6 Drawing Figures

INVENTOR

WALTER DIETRICH

BY *[signature]*

ATTORNEY

INVENTOR

WALTER DIETRICH

BY

ATTORNEY

INVENTOR
WALTER DIETRICH
BY [signature]
ATTORNEY

INVENTOR

WALTER DIETRICH

BY [signature]

ATTORNEY

INVENTOR
WALTER DIETRICH
BY [signature]
ATTORNEY

CHARACTER RECOGNITION USING SHAPE DETECTION

BACKGROUND OF THE INVENTION

The present invention relates to a process for the automatic character recognition, in which the characters are broken up into their characteristic shape elements, and in which the scanned and electrically stored shape elements are detected by probes corresponding to the shape elements. The shape elements are successively fed to the probes, and in that the probe which most nearly agrees with the particular shape element is detected by means of a first maximum (extreme value) detecting circuit. The probe thus detected is assigned to the relevant character on the basis of its location in the character area, in that for each character the number of probes assigned thereto is stored and the character with the largest number of assigned shape elements is determined and recognized by means of second maximum (extreme value) detecting circuit. The character area is divided into zones, and the order of succession of the shape elements within a zone is not taken into consideration, according to German Pat. No. P 17 74 314.5.

Character recognition is encountered by the difficulty that similar characters are sometimes difficult to distinguish, especially when the set of characters comprises a great number of different characters, and when the characters to be recognized are of a poor printing quality.

In order that the recognition, in these cases, can be made more reliable, it is known to weight individual parts of the recognition circuit, so that the corresponding parts of the scanned and stored character are more significant in the recognition procedure than the remaining parts of the same character. Examples relating to the weighted recognition which, in many cases, can be realized in a very simple way by employing different high resistances, are to be found in the stylized figures "3" and "5", or in the capital letters "O" and "Q". One such weighted recognition as applied to a fully parallel recognition process, is described in the U.S. Pat. No. 3,104,369.

In the U.S. Pat. No. 3,182,290 there is described an improvement in or relating to the process according to U.S. patent mentioned hereinbefore; according to this improvement similar characters, for example, C, O, G and Q, are assembled to form one group. In the course of a coarse recognition, whether the character belongs to the group is checked, and in the course of a fine recognition, which is performed parallel, there is determined with respect to one part of the character, which character it is of the group.

SUMMARY OF THE INVENTION

An object of the invention is to increase the recognition reliability of this type of character recognition arrangement.

A feature of the invention is that for enabling a better distinction of a character from other similar characters, there is carried out an additional discrimination in a characteristically identical zone with respect to at least one other similar character, and that the result of this additional discrimination is stored until the end of the recognition procedure, thus either increasing the recognition reliability of the character whose shape element (elemental area) has been examined in the fixed zone in the course of additional discrimination and/or decreasing that of the other characters.

Another feature of the invention is that for enabling a better distinction of a character from other similar characters, during the assignment of shape elements to zones and characters upon occurrence of a shape element in a zone which is characteristically identical with respect to at least one other similar character, a binary counter associated with the character is stepped forwards, and a counter associated with the similar character is stepped backwards.

BRIEF DESCRIPTION OF THE DRAWINGS

The invention will now be explained in connection with the accompanying drawings, in which.

DESCRIPTION OF THE PREFERRED EMBODIMENTS

Figure 1:
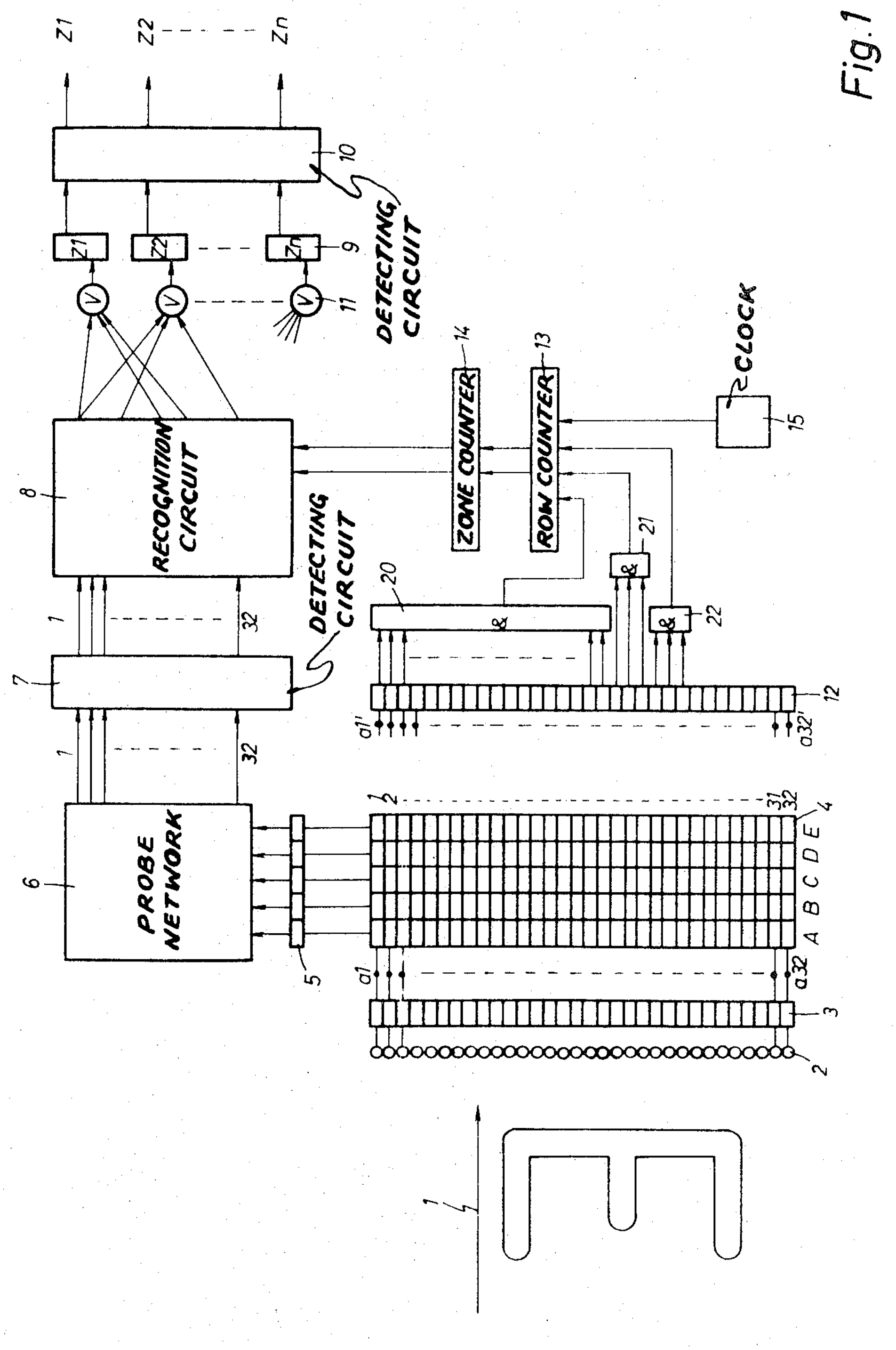
FIG. 1 shows a block diagram of an arrangement to be improved.

The process of the arrangement shown in FIG. 1 will be explained. Assumed, by way of example, that the digit "3" is being scanned and is moving across the series of photocells (optical transducers) 2 in the direction as indicated by the arrow 1. To compensate for variations in height, changes cells (series of optical transducers) is longer that the height of the character. The signals from the photocells are amplified and digitalized in the associated circuit 3, preferably in four gray value stages. The signals appearing at the outputs $a_1 \ldots a_{32}$ are stored, column by column, in the two-dimensional shift register 4, and are moved forward therein again column by column owing to the gray value stages, the shift register comprises double as many columns as scanning columns are available.

When the character is stored in its entirety, it is read out line by line perpendicularly in relation to the storing direction. At each shift pulse, one line of the character is stored, and the probe register 5 is adapted to receive only one line at a time into the probe network 6. The probe network 6 contains as many columns as the shift register 4 and as many rows as are necessary for reliable recognition of the characters, in the present example not more than 32.

At each shift pulse, one of the probes, namely the one which most nearly agrees with the part, i.e., the row of the character stored in the probe register, will deliver the maximum signal. This is detected by the maximum detecting circuit 7 and passed on to the recognition circuit 8. In the recognition circuit there is effected the assignment of the detected probe to all of those characters which have the shape characterized by said probe in the row under consideration. However, there will be only one character to which all of the statements of the maximum detecting circuit 7 will apply, that is the character being scanned, while in the case of all other characters only some of the signals will apply. Therefore, the correct character must be detected in a second recognition stage. The binary counters 9 (Z1 . . . Z*n*) and the maximum detecting circuit 10 are provided for this stage. Each of the counters Z1 to Z*n* is allocated to one character included in the set of characters. The recognition signals of the recognition circuit 8, in which the line-by-line assignment of the probe occurs, are fed, via the OR-circuit 11, as counting pulses to those counters whose associated character has the feature exhibited by the probe. The particular counter (Z1 . . . Z*n*) will have the highest total whose associated character has been scanned. The last step is to detect this counter by the maximum detecting circuit 10. The height register 12, together with the AND-circuits 20, 21, 22, serve to detect the size of the character. Both the row counter 13 and the zone counter 14 serve to assemble several rows to form one zone. The shift and count clock pulse are derived from the common clock-pulse generator 15.

Further details of this process will be referred to in the course of this specification if so required for enabling a better understanding of the invention.

Figure 4:
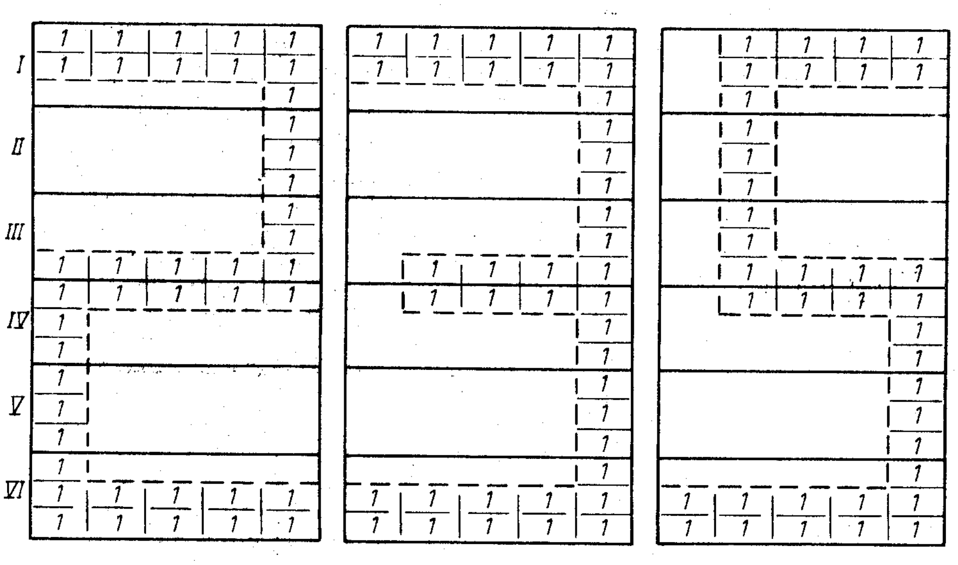
FIG. 4 shows the stylized characters 2, 3 and 5.

Referring to FIG. 4, the character area is subdivided into six zones. Since one shape element consists of five bits, 32 different shape elements are possible, which are numbered from 1 to 32.

According to the invention, a prerecognition is carried out with the aid of a maximum detecting circuit. The stylized digits in FIG. 4 are reliably distinguished in zone V with the aid of the probes 2 and 17:

| No. | Zone | Probe | Shape element | Maximum Detection | Digit |
|---|---|---|---|---|---|
| 1 | V | 2 | 10000 | S.2>S.17 | 2, not 3 |
| 2 | V | 17 | 00001 | S.17>S.2 (S = probe) | 3, not 2 |

The probes may also be chosen so that they will supply, in the case of an inaccurate centering in the horizontal direction, the proper statement:

| | | | | | |
|---|---|---|---|---|---|
| 3 | V | 4 | 11000 | S.4>S.25 | 2, not 3 |
| 4 | V | 25 | 00011 | S.25>S.4 | 3, not 2 |

The statement of No. 3 also applies to the following group of digits:

2, not 3, 4, 5, 9.

The same statement, in addition, but with a somewhat reduced safety spacing, also applies to the group of digits:

2, not 0, 6, 8.

The inverted statement of No. 4, resulting from the same maximum detection, applies to the group of digits:

3, not 2, and with a somewhat reduced safety spacing, also applies to the group of digits:

3, not 0, 6, 8.

These are the statements of increased safety with respect to digits 2 and 3 as compared to one another and to the other listed digits. The same statement, but with an inverted sign, provides increased safety for the other digits, in the top example:

3, not 2
4, not 2
5, not 2
9, not 2.

Correspondingly the same applies to the other examples.

Figure 2:
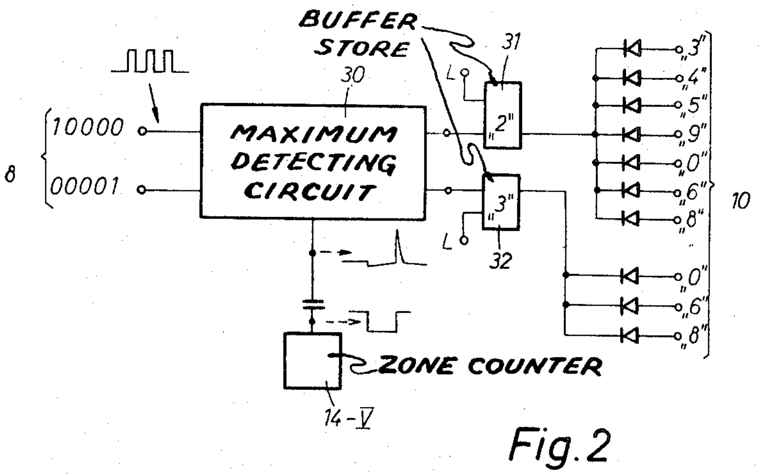
FIG. 2 shows the prerecognition stage.
Figure 3:
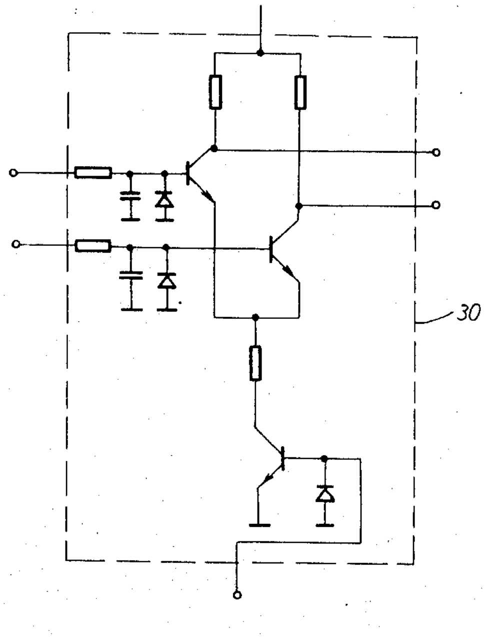
FIG. 3 shows the maximum detecting circuit 30 according to FIG. 2.

One arrangement for carrying out this detection is shown in FIG. 2. FIG. 3 shows the maximum detecting circuit 30 of FIG. 2. When evaluating the digit 2, the probe 2 (10,000) will respond three times in zone V; the three pulses are taken at the column lead 2 V for the zone V of digit "2", and are passed on to the upper input of the maximum detecting circuit 30. The lower input is connected to the column lead of zone V of digit "3." In FIG. 3, the three pulses are integrated by the input switching circuits (in this particular example, by the upper one of the two switching circuits), to provide the proper result in the case of a poor printing quality, and to fully utilizing the capability of the following maximum detecting circuit. The output signal will always be correct if two of the three pulses are missing, because no pulse is applied to a lower input circuit in the case of the digit 2. The maximum detecting circuit 30 is only interrogated at the end of zone V, and is denoted by the lower switching circuit in FIG. 3. In the given switching mode, the output diodes are used for reducing the output voltages of the counters associated with the stated digits; in this way the maximum detecting circuit 10 decides more reliably with respect to the digit 2.

It should be noted, that the digits stated on the output side of FIG. 2, are not all critical with respect to the digit "2."This statement only shows the possibilities of expansion provided by only one additional probe distinction.

The buffer store 31 for the digit "2", or the buffer store 32 for the digit "3" are necessary because the decision of the maximum detecting circuit 30 must be considered up to the end of the evaluation of the read character. Upon recognition of the character, the buffer stores are reset on line "L".

The prerecognition or distinguishing circuit according to FIG. 2 has only two inputs and integrates the probe output voltages throughout the entire zone to provide correct decisions, when the two character parts to be distinguished are similar.

Within the purpose of the invention, there is proposed an arrangement which includes all these advantages and which can be easily used with the recognition circuit according to FIG. 1.

This arrangement will now be explained by way of example with reference to FIGS. 4, 5 and 6.

In the following tables 3/3 has the following meaning: "-scanned character 3/ output signal of the recognition for the character 3," and correspondingly:

3/5 = "scanned character 3/ output signal of the recognition circuit for character 5."

With the aid of the weighting as shown in the FIG. 4, and together with the circuit according to FIGS. 5*a* to *c* (but without the two transverse connections a and b), the following conditions will result:

| pair of digits | 3/2 | 3/3 | 3/5 |
|---|---|---|---|
| counter reading | 10 | 18 | 10 |

Accordingly, there is correctly recognized the digit "3" from the highest counter reading.

The spacing between the counter readings 18 and 10 is large enough for reliably distinguishing the characters. "Real" characters, however, are comparatively subjected to considerable deficiencies by which the spacing is reduced. Therefore, a still further increase of the spacing between the digits "3" and "2" is effected. Firstly, the parts of the character which are important for the distinction, are more heavily weighted. For example, in FIG. 4 zone V, the shape element 10,000 of digit "3" by the factor 4, so that in a known resistance matrix, the corresponding conductances are made four times as large, and the signals are switched to a higher binary stage.

With such a weighting the following will result:

| pair of digits | 3/2 | 3/3 | 3/5 |
|---|---|---|---|
| counter reading | 10 | 27 | 10 |

In distinction to this measure which, in this case, has been successful, the following will result with respect to the scanning of the digit 5, at first for the sake of comparison without weighting:

| pair of digits | 5/2 | 5/3 | 5/5 |
|---|---|---|---|
| counter reading | 2 | 10 | 18 |

whereas with a weighting the following will result:

| pair of digits | 5/2 | 5/3 | 5/5 |
|---|---|---|---|
| counter reading | 2 | 19 | 18 |

Accordingly, the digit "5" is erroneously recognized as digit "3", because the counter reading in respect of digit "3" is higher. This weighting is without success in this particular case.

Figure 5:
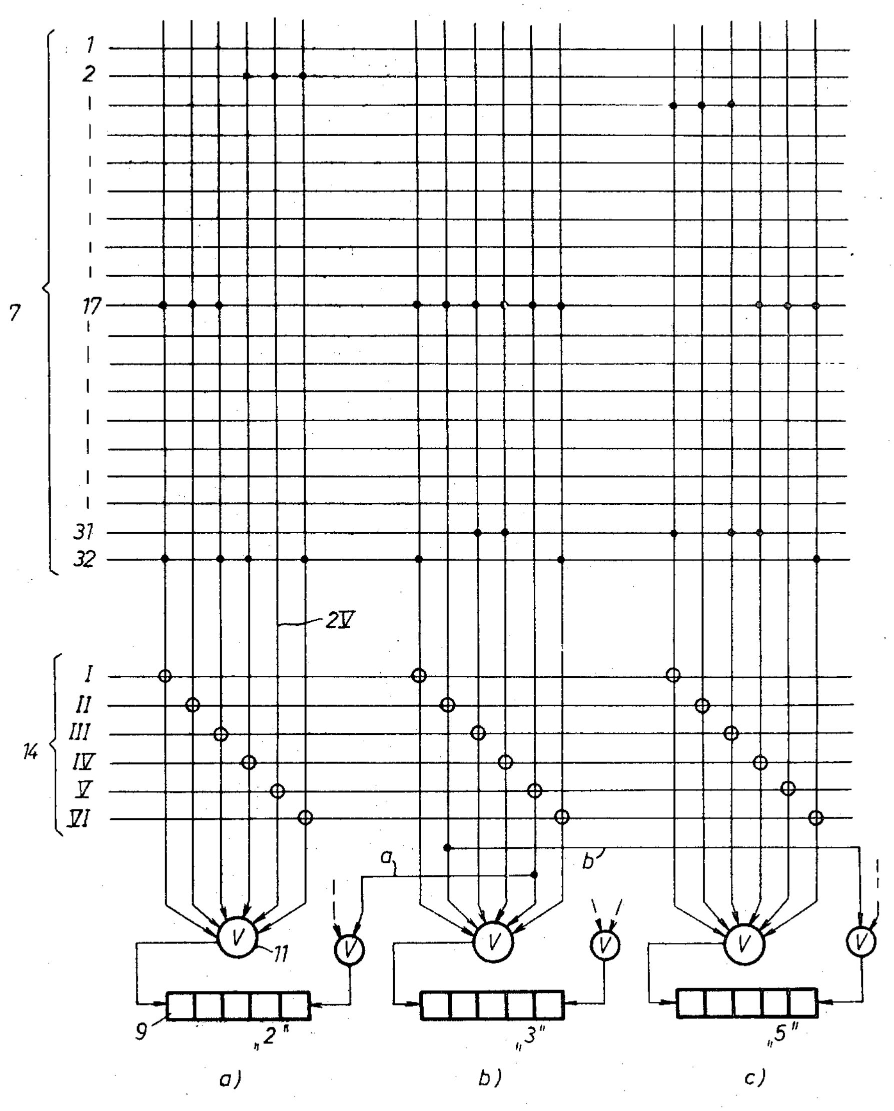
FIG. 5 shows a first type of embodiment of the maximum detecting circuit.
Figure 6:
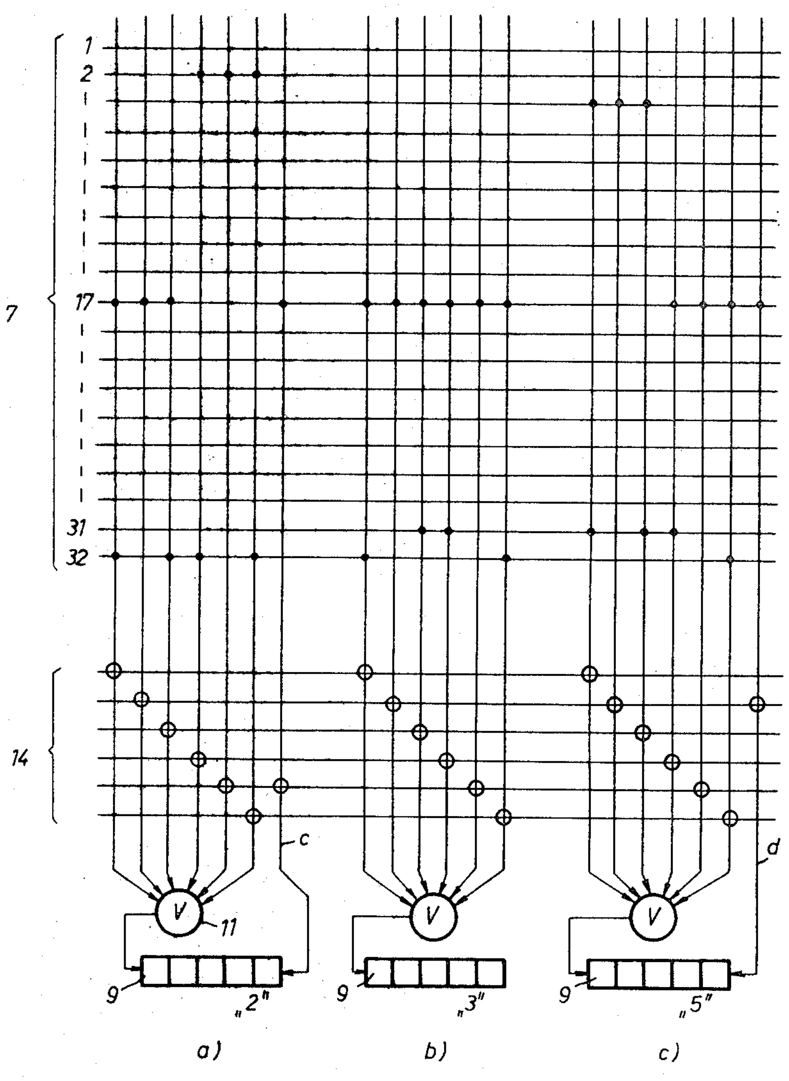
FIG. 6 shows a second type of embodiment of a maximum detecting circuit.

Instead of—or in addition to—this, the characters non-recognized in the course of recognizing the shape elements of one zone, are negatively influenced from the character as recognized in the zone by the transverse connections *a* and *b* in FIG. 5.

For this purpose, there is provided binary counters which are capable of adding (arrow from the left) and of subtracting (arrow from the right).

For comparison, and without the transverse connections *a* and *b*, the following will result as above:

| pair of digits | 3/2 | 3/3 | 3/5 |
|---|---|---|---|
| counter reading | 10 | 18 | 10 |

With the transverse connections and a weighting, a pulse from the right resets the binary counter by one position, the following will result:

| pair of digits | 3/2 | 3/3 | 3/5 |
|---|---|---|---|
| counter reading | 7 | 18 | 7 |

As indicated, the spacing with respect to the digit "2" has been improved in that from the digit 3 in zone V three pulses, via the transverse connection *a*, reduce the counter "2" by three; accordingly, in zone II the counter of digit "5" is reduced by three positions.

By OR-circuits 33, in lines *a* and *b*, it is determined that other characters may be connected in order to increase the spacing of these other characters with respect to the digits 2, 3 or 5.

It should be noted that all characters having a black stroke on the right in zone II, hence by the digits 0, 2, 3, 7, 9, the counter reading of the digit "5" is reduced by three positions, which also increases the recognition reliability of these characters. The counter of digit "2" is reduced by three positions during the scanning of all characters having a black stroke on the right in zone V, of the digits these are 0, 3, 5, 6, 8, 9, and also increase the spacing of these digits with respect to the digit "2."

A modification of the arrangement of FIGS. 5*a* to *c* is shown in FIGS. 6*a* to 6*c*. Here, the negative influence is arranged directly at the respective characters. The effect is exactly the same, but the cost is somewhat higher. However, the entire recognition circuit for each character is assembled separately, which is often considered as an advantage in manufacturing. In this case it would be advisable to arrange the entire recognition of FIG. 6*a* on one circuit board to avoid the transverse connections *a* and *b* which are required in the rack wiring.

Finally, it is to be noted, that the integration circuit in FIG. 3 which enables a maximum detection when parts of the character are missing in the zone, is replaced in the arrangements according to FIGS. 5*a* to 5*c* or FIGS. 6*a* to 6*c* respectively, by the summation of three pulses per zone, of which then one or more will be missing whenever the character has faulty points within the zone.

Although I have described the invention in connection with specific apparatus, it should be clearly understood that the description is made by way of example only and not as a limitation on the scope of my invention as defined by the accompanying claims.

What is claimed is:

1. In an automatic character recognition arrangement, in which the characters are broken up into their characteristic shape elements, in which the scanned and electrically stored shape elements are detected by probes corresponding to the shape elements, in which the shape elements are successively fed to the probes so that the probe most similar to the particular shape element is detected by means of a first maximum detecting circuit, whereupon the probe thus detected is assigned to the relevant character on the basis of its location in the character area, and in which for each character the number of probes assigned thereto is stored and the character with the largest number of assigned shape elements is determined and thus recognized by means of a second maximum detecting circuit, and in which the character area is divided into zones and the order of succession of the shape elements within a zone is not taken into consideration, the improvement comprising:

an additional discrimination means in a characteristically identical zone with respect to at least one other similar character;

means for storing the result of the additional discrimination until the end of the recognition procedure, so that the character whose shape element has been examined in the fixed zone in the course of the additional discrimination increases its recognition reliability;

binary counter means coupled for each character for the purpose of storing the detected probes, so that for effecting an additional distinction, a shape element of the character to be recognized is detected and stored; and means associated with the character to step the counter means forward and means associated with the similar character to step the binary counter backward.

2. An arrangement according to claim 1 including a third maximum detecting circuit coupled to detect what character the shape element belongs to, and an output signal of said third maximum detecting circuit acts upon the output signals of the counters associated with the similar characters.

3. In an automatic character recognition arrangement in which the characters are broken up into their characteristic shape elements, in which the scanned and electrically stored shape elements are detected by probes corresponding to the shape elements, in which the shape elements are successively fed to the probes, so that the probe most similar to the particular shape element is detected by means of a first maximum detecting circuit, whereupon the probe thus detected is assigned to the relevant character on the basis of its location in the character area, and in which for each character the number of probes assigned thereto is stored and the character with the largest number of assigned shape elements is determined and thus recognized by means of a second maximum detecting circuit, and in which the character area is divided into zones and the order of succession of the shape elements within a zone is not taken into consideration, and including one binary counter for each character to store the outputs of the probes, that for the purpose of enabling a better distinction of a character from other similar characters, during the assignment of shape elements to zones and characters upon occurrence of a shape element in a zone which is characteristically identical with respect to at least one other similar character, the improvement comprising means associated with the character to step the binary counter forward and means associated with the similar character to step the binary counter backward.

4. The arrangement of automatic character recognition according to claim 3 wherein the zone column lead of one character is connected to the reset input of the binary counter associated with the other character.

5. The arrangement of automatic character recognition according to claim 3 in which at said other character there is provided a separate zone column lead which is connected to the reset input of said binary counter.

* * * * *